(12) United States Patent
Burghard et al.

(10) Patent No.: US 7,683,761 B2
(45) Date of Patent: Mar. 23, 2010

(54) METHOD FOR AUTONOMOUS ESTABLISHMENT AND UTILIZATION OF AN ACTIVE-RF TAG NETWORK

(75) Inventors: Brion J. Burghard, West Richland, WA (US); James R. Skorpik, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 1061 days.

(21) Appl. No.: 11/044,944

(22) Filed: Jan. 26, 2005

(65) Prior Publication Data

US 2006/0164213 A1    Jul. 27, 2006

(51) Int. Cl.
*H04Q 5/22*    (2006.01)
(52) U.S. Cl. ............... 340/10.2; 340/10.3; 340/10.4; 340/10.5; 340/825.72; 455/41.2; 455/456.1; 455/517
(58) Field of Classification Search ............. 340/10.2, 340/10.1, 572.1, 539.12, 10.4, 10.5, 825.72, 340/10.3; 370/392, 338; 709/238, 203; 455/41.2, 455/456.1, 517
See application file for complete search history.

(56) References Cited

U.S. PATENT DOCUMENTS

| | | | |
|---|---|---|---|
| 5,123,089 A * | 6/1992 | Beilinski et al. | 709/237 |
| 5,307,349 A * | 4/1994 | Shloss et al. | 370/442 |
| 5,640,151 A | 6/1997 | Reis et al. | |
| 5,650,993 A * | 7/1997 | Lakshman et al. | 370/236 |
| 5,686,902 A | 11/1997 | Reis et al. | |
| 5,774,876 A * | 6/1998 | Woolley et al. | 705/28 |
| 5,776,278 A | 7/1998 | Tuttle | |
| 5,779,839 A | 7/1998 | Tuttle | |
| 5,914,862 A | 6/1999 | Ferguson | |
| 5,963,650 A | 10/1999 | Simionescu | |
| 6,040,573 A | 3/2000 | Sporleder | |
| 6,045,652 A | 4/2000 | Tuttle | |
| 6,075,707 A | 6/2000 | Ferguson | |
| 6,195,858 B1 | 3/2001 | Ferguson | |
| 6,220,516 B1 | 4/2001 | Tuttle | |
| 6,375,780 B1 | 4/2002 | Tuttle | |
| 6,496,382 B1 | 12/2002 | Ferguson | |
| 6,617,963 B1 * | 9/2003 | Watters et al. | 340/10.41 |
| 6,700,493 B1 | 3/2004 | Robinson | |

(Continued)

FOREIGN PATENT DOCUMENTS

EP    0743615 A1    11/1996

(Continued)

OTHER PUBLICATIONS

Akyildiz I.F., et al., A Survey on Sensor Networks, IEEE Communications, vol. 40, #8, Aug. 2002 pp. 102-114, XP001142609 (the whole document).

*Primary Examiner*—Vernal U Brown
(74) *Attorney, Agent, or Firm*—Allan C. Tuan

(57) ABSTRACT

Methods to autonomously establish and utilize a network of active RF tags can include the steps of providing a plurality of active RF tags within a volume of interest, providing at least one data collection node, registering the active RF tags, populating a routing index stored in each tag's data storage device, and communicating data between the active RF tags and the data collection node according to the routing indices. The method can be implemented on a computer-readable medium.

31 Claims, 4 Drawing Sheets

U.S. PATENT DOCUMENTS

| | | |
|---|---|---|
| 2001/0007335 A1 | 7/2001 | Tuttle |
| 2003/0033032 A1 | 2/2003 | Lind |
| 2003/0106204 A1 | 6/2003 | Ferguson |
| 2003/0137968 A1 | 7/2003 | Lareau |
| 2003/0152041 A1 | 8/2003 | Herrmann et al. |
| 2003/0227382 A1 | 12/2003 | Breed |
| 2004/0002305 A1* | 1/2004 | Byman-Kivivuori et al. .................... 455/41.2 |
| 2004/0041706 A1 | 3/2004 | Stratmoen |
| 2004/0104717 A1 | 6/2004 | Bondarev |
| 2004/0174260 A1 | 9/2004 | Wagner et al. |

FOREIGN PATENT DOCUMENTS

| | | |
|---|---|---|
| WO | WO 99/17477 | 4/1999 |
| WO | WO 03/152041 A1 | 8/2003 |
| WO | WO 03/090411 A | 10/2003 |
| WO | WO 2004/022434 A3 | 3/2004 |
| WO | WO 2004/025554 A1 | 3/2004 |
| WO | WO 2004/066236 A1 | 8/2004 |

\* cited by examiner

```
301 ┌─Record 0─┐
   ┌─Field A
   │ Byte 0x00      LSB of Original Sender/Message Target Node UID
   │ Byte 0x01      MSB of Original Sender/Message Target Node UID
   │ Field B
   │ Byte 0x02      LSB of Level (N-1) Node UID (Retransmit to Target)
302│ Byte 0x03      MSB of Level (N-1) Node UID
   └─Field C
     Byte 0x04      LSB of Level (N+1) Node UID (Retransmit for Sender)
     Byte 0x05      MSB of Level (N+1) Node UID Record 1, Record 2, ...

┌─Record N─┐
     Byte (N*6)     LSB of Original Sender/Message Target Node UID
     Byte (N*6)+1   MSB of Original Sender/Message Target Node UID
     Byte (N*6)+2   LSB of Level (N-1) Node UID (Retransmit to Target)
     Byte (N*6)+3   MSB of Level (N-1) Node UID
     Byte (N*6)+4   LSB of Level (N+1) Node UID (Retransmit for Sender)
     Byte (N*6)+5   MSB of Level (N+1) Node UID
```

*Fig. 3*

METHOD FOR AUTONOMOUS ESTABLISHMENT AND UTILIZATION OF AN ACTIVE-RF TAG NETWORK

SUMMARY

An embodiment of the invention encompasses a method to autonomously establish and utilize a network of active RF tags. The present embodiment can utilize a message frame structure for communications and comprises the steps of providing a plurality of active RF tags within a volume of interest, providing at least one data collection node, registering the active RF tags, populating a routing index stored in each tag's data storage device, and communicating data between the active RF tags and the data collection node according to the routing indices. The message frame structure comprises an application identifier field. Communication between active tags and between active tags and the data collection node can be direct or indirect. Indirect communication involves communicating through intermediate active RF tags when a target tag is outside of the effective transmit range of a sending tag.

Another embodiment of the invention encompasses a computer readable medium comprising a program for autonomously establishing and utilizing an active RF-tag network. The program comprises logic to discover active RF tags within a volume of interest, wherein the tags are accessible directly, or indirectly, by a data collection node. The program further comprises logic to populate a routing index in the data storage devices of registered, active RF tags, and logic to communicate data according to said routing indices. The program can utilize a message frame structure having an application identifier field for communications.

DESCRIPTION OF DRAWINGS

Embodiments of the invention are described below with reference to the following accompanying drawings.

FIG. 3 is a schematic representation of an embodiment of a routing index.

DETAILED DESCRIPTION

Figure 1:
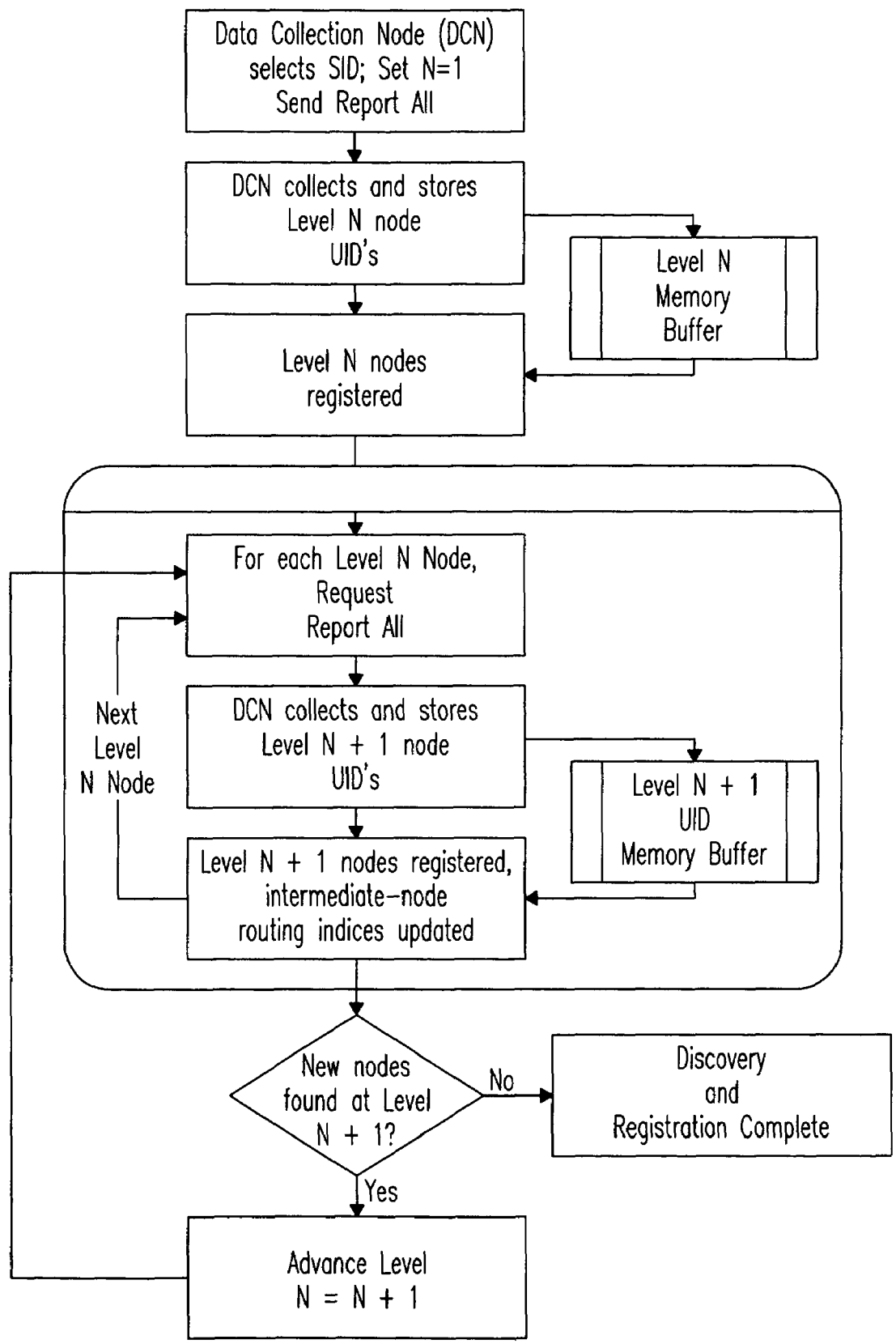
FIG. 1 shows a flowchart of an algorithm to discover and form a network of registered, active RF tags in accordance with embodiments of the present invention.

For a clear and concise understanding of the specification and claims, including the scope given to such terms, the following definitions are provided.

RF devices can be described by three classes—passive, semi-passive, and active. When used herein with reference to tags, nodes, and RF communications, Active can refer to devices having RF communication electronics supplied by an on-board battery. Active tags are typically the most versatile and can be characterized by the presence of an active RF transmitter. In contrast, passive tags typically use backscatter modulation to reflect incoming RF energy to communicate via a code sequence. Passive tags do not usually contain batteries, but rather rely on the RF energy to power the electronic components. Semi-passive tags often have an energy-storage device (e.g., battery, capacitor, etc.) that powers the on-board electronics, however, semi-passive tags still use backscatter modulation for communication, like fully-passive tags.

As used herein, data collection node can refer to a point on a network having a device that collects data from the tags in the network. The data collection node can comprise a reader or an interrogator. Reader can refer to a device that interrogates RF tags within a given range. The reader can have the ability to initiate transmission of command data and to retrieve information such as situational data, health, and more. In one embodiment, the reader can be an active-RF-tag-based device that has been designated and equipped to interrogate other tags. In such an instance, the active RF tag/reader can have additional electronics and software to allow the reader to interface with a higher-order device including, but not limited to a PDA or a computer. An interrogator can also refer to a device that retrieves data from active RF tags within range. Interrogators can comprise a higher-order device, such as a computer, laptop, or PDA. Typically, interrogators operate through the reader and can refer to a combination of a higher-order device interfaced to the reader. The interrogator can further have the ability to condition, display, process, and/or analyze the retrieved information.

As used herein, level n nodes can refer to at least one active RF tag, which tag is n transmissions away from the data collection node, wherein n is an positive integer. Thus, a level 1 node can be an active RF tag that is within the effective transmit range of the data collection node and can, therefore, be directly accessed. A level two node can be accessed within two transmissions—the original transmission sent by the data collection node and a retransmission by one or more level 1 nodes. A level 2 node would be within the effective transmit range of at least one level 1 node. As will be described, a repeater tag can serve as a level n node to extend the range of accessibility. The effective transmit range of the level n nodes may or may not be the same as that of the data collection node.

Situational data can refer to information regarding the physical conditions near or surrounding the active RF tag, including, but not limited to temperature, acceleration, tag position, vibrations, shock, motion, strain, humidity, pressure, radiation, electrical fields, conductivity, impedance, magnetic fields, electromagnetic irradiation, chemical, biological, flow, viscosity, density, sound, ultrasound. It can also refer to an event, a series of events, object status, and more; for example, inappropriate tampering, human pulse rate, tag health, information records, and battery life, respectively.

Embodiments of the present invention comprise methods and programs on a computer readable medium to autonomously establish and utilize an active RF-tag network. The network can comprise a data collection node and a plurality of active RF tags within a volume of interest. The active RF tags can each have at least one sensor for detecting situational data. The sensor can be internal to the tag or it can be a separate, external device that communicates with the tag via a common interface. Examples of communication interfaces include, but are not limited to, USB, parallel, serial, PCMCIA, BNC, fiber optic, BLUETOOTH, cell phone, IR, satellite link, land wire, internet link, acoustic coupling, and combinations thereof. In order to maximize the tag's battery life, each tag can utilize a plurality of power consumption modes including, but not limited to, a power-saving sleep mode, a low-power RF sniff mode, and a fast-sniff mode. One non-limiting example of a suitable active RF tag is a FlexiTag. Details regarding FlexiTags are described in U.S. patent application Ser. No. 11/044,872, by Skorpik et al., entitled "Bendable, Active Radio-Frequency Sensor Tags and a System of Same," which details are hereby incorporated by reference. Each active RF tag comprises an application identifier and an approximate first effective transmit range. The data collection node has an approximate second effective transmit range that could be the same as, or different from, that of the active RF tags.

An aspect of establishing the network can comprise registering the active RF tags. FIG. 1 is a flowchart showing an algorithm used in one embodiment of the present invention for forming a network of registered tags. Without registration, an active RF tag can still receive and respond to certain commands, but the tag would not participate in retransmissions to specific neighboring tags. Unregistered tags can be discovered and registered in a substantially sequential fashion according to a tag's level. For example, level 2 nodes can be discovered by level 1 nodes searching for active RF tags within their effective transmit range. Upon receiving a report all command, the level 2 nodes can transmit their UIDs to the level 1 nodes. The level 1 nodes can add the level 2 nodes to its routing index and broadcast the newly-discovered level 2 node UIDs back to the data collection node (routing indices are discussed in further detail below). The level 2 nodes, which are within the transmit range of the level 1 nodes, would also receive the transmission that was intended for the data collection node. Upon receipt, the level 2 nodes can update their registration status from FALSE to TRUE. In an analogous fashion, level n nodes could discover level n+1 nodes and add the level n+1 node UIDS to their routing indices, while the level n+1 nodes are registered. Furthermore, the process can be executed to discover and register individual tags that enter the network. For tags utilizing multiple power modes, discovery and registration can be preceded by a command to enter a practical mode for receiving commands, for example, the fast RF sniff mode described earlier.

Routing indices of the registered nodes can be populated using connection strings and can provide path data for communication between nodes. The routing indices can be stored in a data storage device of each of the registered active RF tags. Examples of data storage devices include, but are not limited to, memory comprising RAM, EEPROM, flash, and combinations thereof.

In one embodiment, the routing index is limited in size and is implemented as a circular buffer, wherein the oldest element is overwritten with the newest element when the buffer is full. Thus, the routing index stored in each tag might only contain information regarding a portion of the entire network of registered tags. Furthermore, the routing index stored in one tag might be different than that in another tag. Information regarding the entire network at a given time can be stored at the data collection node, which might have a larger capacity data storage device. In another embodiment, the routing index comprises a routing table, which can maintain a list of UIDs for registered nodes and can further contain tag-location data for each UID in the table. Examples of tag-location data can include, but are not limited to, information from GPS, dead reckoning, and combinations thereof.

The routing index can be updated iteratively after each new level of nodes is registered, thereby expanding the network of registered tags. In order to account for tags entering and leaving the network, the tags can be remapped periodically and/or in response to a command. An active RF tag's routing index can further be populated and/or updated as the tag receives transmissions having a connection string. The connection string can comprise path data including, but not limited to, a list of UIDs that would establish a connection to a distant tag. Upon receiving a transmission having a connection string, the intermediate tags can read the string and update their routing indices as they relay the message. For example, when a tag receives the transmission, it can read the string and compare it to its existing routing index to determine whether the instant tag is an intermediate tag between the sending tag and the target tag. If the tag is an intermediate tag, it can relay the transmission and update its routing index in accord with the other listed UIDs in the connection string.

Figure 2A:
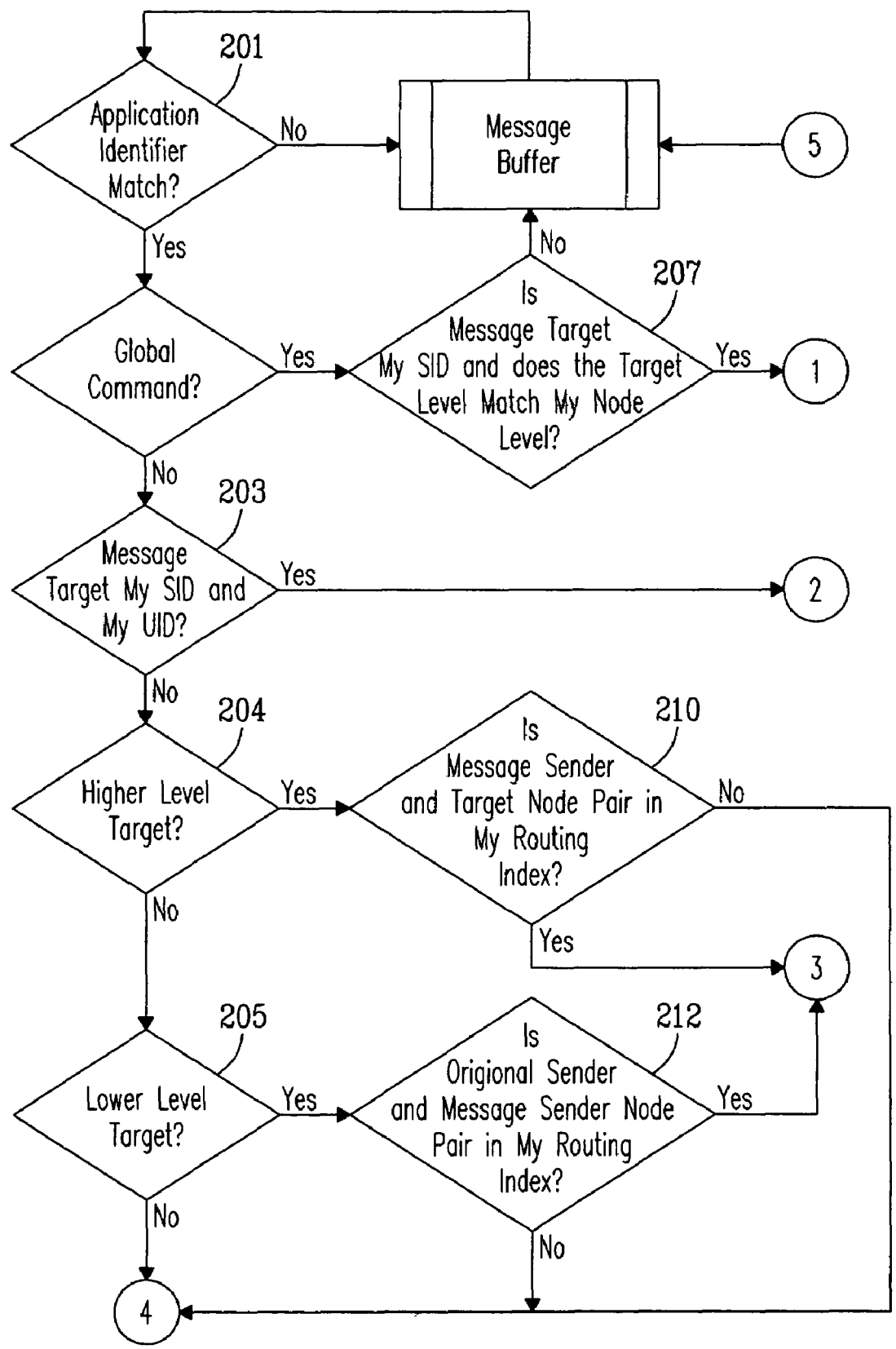
FIGS. 2a and 2b show a flowchart of an algorithm to process received messages in accordance with embodiments of the present invention.
Figure 2B:
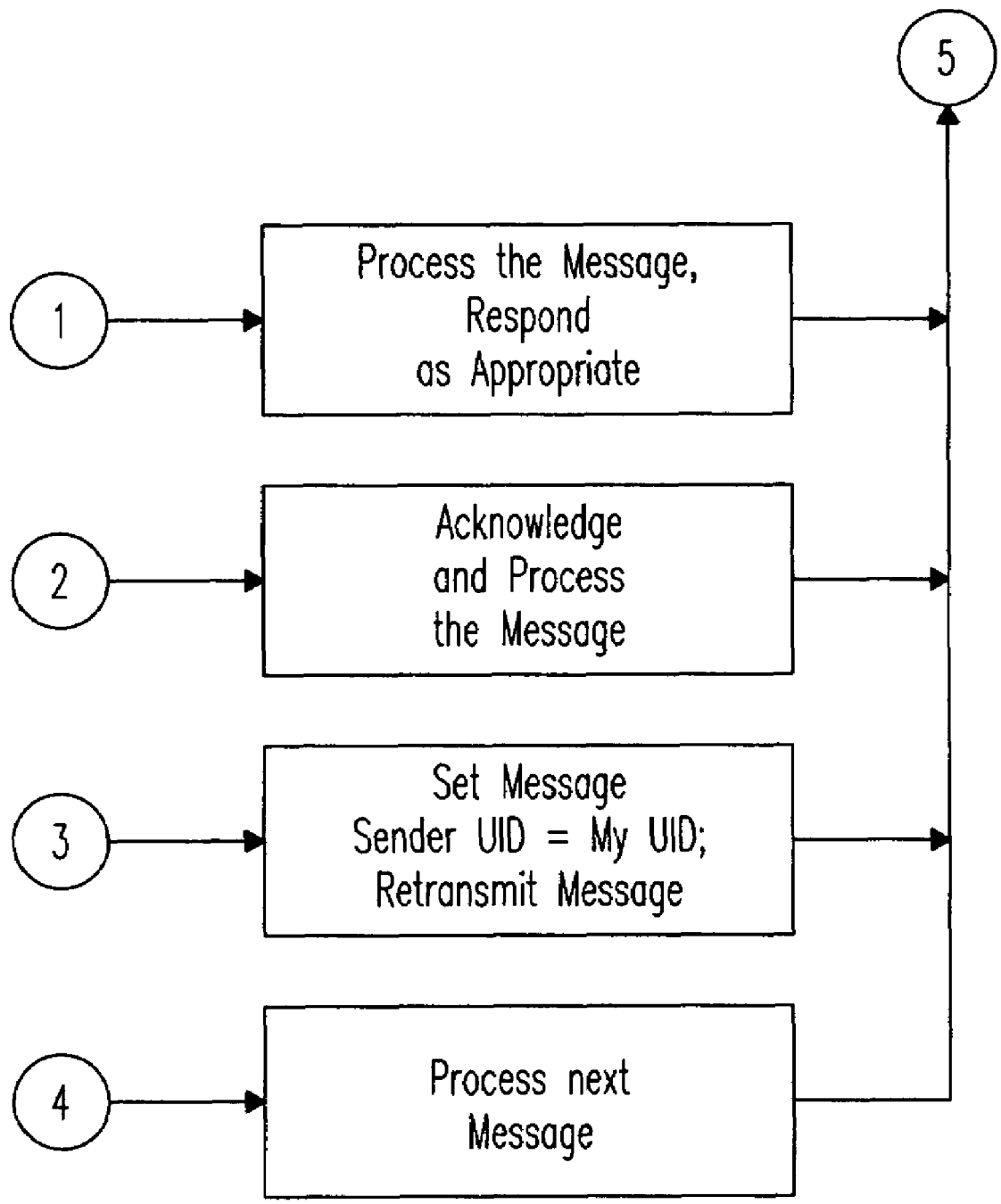

The logic for registering active RF tags, for generating and maintaining routing indices, and for communicating data according to the routing indices can be embodied in a computer readable medium comprising a program that is stored in the data collection node and/or the active RF tags. The program can be software, firmware, or combinations thereof and can provide a protocol for communication of commands and data using a message frame structure. It can further comprise logic to control power consumption, wherein each active RF tag can operate at one of a plurality of power consumption modes. FIG. 2 shows a flowchart of an algorithm to discover and form a network of registered, active RF tags.

In one embodiment, the plurality of modes comprises a powered-off mode, a sleep mode, a low-power RF sniff mode, and a rapid RF sniff mode. The powered-off mode is a storage state, in which the tag consumes no power. The tag can be brought out of this mode by a mechanical, magnetic, or optical switch. No data would be collected in this mode. The sleep mode is the lowest power consuming state and does not listen for RF commands. However, the tag may perform other operations including, but not limited to, acquire situational data and perform health status checks. Such activity can occur at pre-programmed times, at regular intervals, or upon detection of certain sensor events. The active RF tag can transition out of sleep mode in response to a stimulus such as one generated by a timer or an RF detection wake-up circuit. In the low-power RF sniff mode, the tag cycles between the sleep state and a RF sniffing state, during which time the tag momentarily activates its RF receiver to listen for commands. With respect to the amount of time spent sniffing, the duty cycle is very short. In one embodiment, the RF sniff state accounts for less than 1% of the duty cycle. In the rapid RF sniff mode, the tag cycles between the sleep state and the RF sniff state at an increased duty cycle compared to the low-power RF sniff mode. Thus, the tag switches to the RF sniff state more often and/or for longer durations in the rapid RF sniff mode.

The message frame structure comprises an application identifier field and can enable communication by providing a common protocol and data structure among the active RF tags and the data collection node. The message frames can have a plurality of fixed lengths including, but not limited to, a short message frame or a long message frame. The short message frame can be used for communications such as commands and short responses. Long message frames can be used to pass a data stream, which can comprise, but is not limited to, built-in test data, routing indices, tag control strings, relative signal strength indicators (RSSI), connection strings, active RF-tag locations, tag health, and combinations thereof. For active RF tags having a sensor, the data stream in long message frames can further comprise sensor control strings, situational data, sensor calibration tables, or combinations thereof.

Regardless of length, the message frame comprises an application identifier field, as described above. It can further comprise a frame descriptor field, an addressing field, and a header check sum field. The application identifier field is used to distinguish messages sent and received from a group of tags deployed for one application from those of another application 201. In such a case, an application identifier can be pre-programmed on each active RF tag. Groups of tags manufactured and deployed for the same application could then be specifically addressed. The application identifier allows groups of tags deployed for different purposes to share the same space without interfering with each other's communications. In one embodiment, the application identifier field has a 4-byte value, which can allow groups from up to 4,294,967,296 different applications to share the same RF space.

The frame descriptor field can define the type of message frame being transmitted. For example, its value can be used to quickly determine whether a transmission is a short message frame or a long message frame, wherein having a least significant byte (LSB) equal to zero represents the short frame and a most significant bit (MSB) equal to one represents the long frame. Examples of message frame types that can be defined by the frame descriptor include, but are not limited to, those listed in Table 1, which summarizes the type, description, and relative size of possible message frames. The invention is not limited to the message frame types listed below, and additional message frame types can be defined as necessary for a particular application.

TABLE 1

Examples of message frame types from an embodiment of the present invention.

| Message Frame Type | Description | Message Frame Length |
|---|---|---|
| Command Frame | Command Frames can be sent from the Data Collection Node to active RF tags to perform node management functions (e.g., tag registration, change tag state, etc.) and to request data from a sensor attached or internal to the tag. Active RF tags may send Command Frames to other active RF tags as requested by the Data Collection Node. | Short |
| Generic Data Frame | Generic Data Frames can be sent from the Data Collection Node to active RF tags to transmit registered UID's and/or routing indices. Generic Data frames can be sent from active RF tags to the data collection node in response to data requests. | Long |
| Sensor Control Frame | Sensor Control Frames can be used to send commands to a sensor on or near the active RF tag. The sensor can be connected to the tag through a variety of interfaces, for example, a serial port. The commands can be sensor-specific control commands defined by the application or sensor manufacturer and can comprise an ASCII string. The response will typically be an ACK (if command was parsed and understood), NACK (if the sensor could not understand the string), or a timeout condition code. | Long |
| Connection-Request Data Frame | Connection-Request Data Frames can be sent from the data collection node to active RF tags and/or repeater tags to establish a chain of tags that will retransmit messages to reach a distant tag. The data packet can contain a connection string. The connection string can comprise a list of UID's that would establish a connection. The last non-zero UID in the string can be defined as the terminal tag of the connection request. Once a connection is established to a distant tag, additional connection request frames may be sent to that distant tag to further extend the network. | Long |
| Command Response Frame | These frames can be sent in response to command frames. They can be used to acknowledge commands and to report error conditions. | Short |

TABLE 1-continued

Examples of message frame types from an embodiment of the present invention.

| Message Frame Type | Description | Message Frame Length |
|---|---|---|
| Sensor Control Response Frame | These frames are sent in response to sensor control data frames. They can be used to acknowledge success or failure of sensor control messages. | Short |
| Connection Request Response Frame | These frames are sent in response to connection request frames. They can be used to acknowledge success or failure of connection requests. | Short |

The addressing field comprises information regarding data transmission and routing. It can utilize segment and unit identifiers. A segment identifier (SID) can be pre-programmed on each active RF tag to allow the data collection node to address a group of tags that are a subset of an application's entire tag population 207. A unit identifier (UID) can also be pre-programmed on each active RF tag and would be unique from all the other tags of a given application. The UID would allow the data collection node to address a single active RF tag on the network 203. Thus, the addressing field can comprise addresses selected from the group consisting a target-node UID (or SID), an originator-node UID, a sender-node UID, and combinations thereof. The addressing field can further comprise a combination of the SID and the UID to uniquely identify a tag from all other tags deployed for a given segment and application.

One embodiment encompasses using the message frame structure described above, further comprising a message sequence ID, a message descriptor, and setup bytes. Message sequence ID's can be generated by the data collection node for every message it sends. The ID remains with the message through relays and can be included with any response sent back to the data collection node. When included with a response, the message sequence ID can be used to associate returned message frames with a specific request. For example, if multiple message frames are returned to the data collection node in response to a data request, each returned message frame can be associated with the original data request according to the frame's unique message sequence ID. The message descriptor field can comprise a value whose function is modified by the frame descriptor. For example, if the frame descriptor value specifies a command frame, then the values of the message descriptor can comprise command codes. Alternatively, if the frame descriptor value specifies a command response frame, then the values of the message descriptor can comprise error condition codes, which can indicate whether a tag successfully received a transmission or whether an error occurred. The setup bytes can be used to modify or parameterize the message descriptors. The message frame can comprise at least one setup byte, whose meaning can be defined as needed for each message descriptor. More detail regarding the setup bytes is given in the example below.

Example of a Message Frame Structure

Table 2 summarizes an example of a message frame structure and examples of byte offset for each field. In this example, the message frame can have two sizes; 18 bytes for short message frames and 276 bytes for long message frames, including an 18-byte header of identical format. The long message frame contains a 256-byte data stream and a 2-byte CRC check sum. While specific message-frame sizes are included for purposes of description, no limitation in scope is intended based upon message-frame size.

TABLE 2

An example of a message frame structure utilized by an embodiment of the present invention.

| Byte Offset (Hex) | Description |
|---|---|
| 00-03 | Application Identifier (LSB first) |
| 04 | Frame Descriptor |
| 05 | LSB - Target Level |
| 06 | MSB - Target Level |
| 07 | LSB - Message Target Node's UID or SID |
| 08 | MSB - Message Target Node's UID or SID |
| 09 | LSB - Message Sender Node's UID |
| 0A | MSB - Message Sender Node's UID |
| 0B | LSB - Original Sender Node's UID |
| 0C | MSB - Original Sender Node's UID |
| 0D | Message Sequence ID |
| 0E | Message Descriptor (Usage defined by FD) |
| 0F | Setup Byte 0 (Usage defined by FD and Message Descriptor) |
| 10 | Setup Byte 1 (Usage defined by FD and Message Descriptor) |
| 11 | Header Check Sum |
| 12-111 | Data Packet (Optional, depends on FD code) |
| 112-113 | Data Packet Check Sum (Sent if Data Packet Sent) |

As mentioned previously, the application identifier field (bytes 0x00-0x03) is used to distinguish messages sent and received from a group of tags deployed for one application from those of another application. The value in the application identifier field of the message frame specifies a group of tags having the same pre-programmed application identifier to which a message is intended. In the present example, the addressing field comprises fields for a target level (byte 0x05), a message target nodes' UID or SID (byte 0x07-0x08), a message sender node's UID (byte 0x09-0x0A), and an original sender node's UID (byte 0x0B-0x0C).

The target level field can define the number of retransmissions that will be required to reach the target tag. It can also be used by intermediate (relaying) tags to calculate the timeout value to wait for a return message. For example, in one embodiment, each tag determines its own level by checking this field when a message is first addressed to it following registration. It can then calculate a time out period to wait after retransmitting a message by subtracting its level from the target's level and multiplying the result by a pre-programmed time-out constant. Thus, a transmitting tag would wait longer before timing out for messages being transmitted through many target levels compared to those being transmitted through only one or two target levels.

The message target node's UID, or SID, can specify the ultimate target of the message frame. A UID can be used for command and control frames intended to operate on an individual tag or data collection node. Alternatively, the message target node field can comprise an SID for commands intended to operate on a group of tags, for instance, all tags in range of the sending node that are one level higher than the sending node. Accordingly, a UID and at least one SID can be programmed in a data storage device of each active RF tag prior to deployment. A combination of the UID and the SID can uniquely identify each tag in a plurality of tags deployed for a plurality of applications. In the present example, the field comprises a 2-Byte value, wherein a particular UID value (e.g., 0x0000) is reserved for broadcast commands and another value (e.g., 0xFFFF) is reserved for data collection nodes. In order to reduce transmission confusion and maximize efficiency, the communication protocol can be designed such that broadcast commands targeting an SID are NOT automatically relayed by registered tags. However, the data collection node can send a command to a specific tag requesting it to transmit a broadcast command to the next highest tag level.

The message sender node's UID can identify the active RF tag that transmitted the message frame. When an intermediate tag relays a frame received from another tag, it replaces the message sender node's UID in the received message frame with its own UID prior to retransmission. In the present example, the message sender node's UID is a 2-byte value.

The original sender node's UID can identify the active RF tag that originally sent the frame. If an intermediate tag relays the message, it would not alter the original sender node's UID in the received message. The target tag utilizes this field to determine the originator of the message. In the present example, the original sender node's UID is also a 2-byte value.

Example of Message Descriptor Field Function

In addition to defining the message-frame type, the frame descriptor can also determine the function of the message descriptor field, as described previously. Table 3, as a non-limiting example, provides a list of code values for the frame descriptors described previously as well as examples of corresponding message descriptors.

TABLE 3

A summary, which is given as a non-limiting example, of Frame Descriptor Codes, the type of message frame that can be represented by each code, and the corresponding message descriptor.

| Frame Descriptor Code (Hex) | Frame Descriptor Description | Message Descriptor |
|---|---|---|
| 80 | Command Frame | Command Codes |
| 01 | Generic Data Frame | Data Format Codes |
| 02 | Sensor Control Frame | Sensor Codes |
| 03 | Connection-Request Data Frame | Byte offset to next UID |
| 81 | Command Response Frame | Error Condition Codes |
| 82 | Sensor Control Response Frame | Error Condition Codes |
| 83 | Connection Request Response Frame | Error Condition Codes |

In the present example, a frame descriptor value of 0x80 can correspond to a command frame and can define the message descriptor values as command codes. The command codes can include, but are not limited to, the following commands, wherein the values for the message descriptor fields (shown in parenthesis) are given as non-limiting examples:

Open Session (MD=0x0CC):

An Open Session command can alert an active RF tag that a data collection node is present and will be issuing additional commands shortly. Upon receiving this command, the tag can compare the command frame's application identifier and SID (or UID) to its pre-programmed values. If both match, the tag, which can have a plurality of power-consumption modes, can change from a low-power RF sniff mode to a rapid RF sniff mode. In the low-power RF sniff mode, the tag might only activate its receiver every several seconds for an approximate duration of a few milliseconds. However, in the rapid RF sniff mode, the tag consumes more power because it would sniff for commands at a higher duty cycle to reduce the latency period required to respond to subsequent commands. When a tag enters the rapid RF sniff mode, it can initiate a timeout timer. When the timer times out, the tag can change back into the low-power RF sniff mode to conserve energy. Each time the tag receives a command, the timer would be reset. The Open Session command can be issued with a particular target node UID (e.g., 0x0000), which would specify that the command frame be broadcast to all tags that are in range of the sending node. Redundant open session commands would be ignored.

Close Session (MD=0xCD):

The Close Session command can put an active RF tag into the low-power RF sniff mode. The command can be issued as a broadcast command to all tags within range of the sending node and at the specified target level.

Report All (MD=0x80):

The Report All command can compel unregistered tags, which have an AID and SID matching that of the message frame and which are in range of the sending node, to report back its UID. In one embodiment, a tag's response to the report all command can follow a different message frame structure than other message frames. The response can be a terse 3-byte message comprising the LSB of the UID, the MSB of the UID, and a check sum. Transmission of responses to the Report All command can be scheduled according to an arbitration scheme, which prevents multiple tags from transmitting at the same time. One example of such a scheme comprises adding setup byte 0 to the tag's 2-byte UID to seed a pseudo-random number generator. The output of the random number generator would be within a given range (e.g., 0x0000 to 0xFFFF). This value, along with the byte in setup byte 1 can be used to calculate a delay that is applied prior to responding to the command. The number returned by the peeudo-random number generator can be used as a numerator, while setup byte 1 can be used as a divisor, for executing an integer divide. The resulting value can be multiplied by a pre-programmed time slot period, which is based on the RF baud rate, to determine the delay used prior to sending the tag's UID. Such a scheme can result in the assignment of each tag receiving a report all command to a fixed number of transmit time slots, wherein the number of slots being are determined by the divisor sent. Such a scheme requires that no two tags within RF range of each other are pre-programmed with the same AID, SID, and UID. After receiving a response from surrounding tags, the requesting node can broadcast a data frame containing the first 128 UIDs collected, as limited by the buffer size of the tags in the present example. Unregistered tags receiving this broadcasted data frame can look for their own UID and, if found, can alter their state from unregistered to registered.

Perform Report All (MD=0x81):

This command requests the target node to issue a report all command and to buffer the UIDs of tags that respond. In this example, the tag issuing the Report All command can buffer as many as the first 128 tag UIDs received. Upon completion of the Report All command, the target tag can return a command response frame. Typically, the Perform Report All command will be followed by a request to send the buffered list of UIDs (see the Send List of Tags Found command).

Send List of Tags Found (MD=0x82):

This command can be issued to request the target node to send back a data frame comprising the list of buffered UIDs generated by performing a Report All command.

Report UID (MD=0x83):

A Report UID command requests the target node to respond by sending a command response frame acknowledging receipt. The command can be used to verify the RF link between tags. The returned command response frame can include an RF Signal Strength Indicator (RSSI) in Setup Byte 0 if RSSI is available on the tag.

Report Location (MD=0x84):

This command causes the target node to respond by sending a data frame comprising location information. The location information can be read from the tag's dead reckoning or GPS electronics.

Report New Sensor Data (MD=0x85):

This command requests the target node to respond by sending a data frame comprising new data from a sensor in, or attached to, the target tag. For tags having multiple sensors, the sensor of interest can be identified by the value of Setup Byte 0, wherein each sensor is pre-programmed with an identifying code. The tag can buffer the most recently sent data in case a retransmission is requested. The next Report New Sensor Data command can cause previously buffered data to be released and the new data to be stored in the buffer.

Retransmit Last Sensor Data (MD=0x86):

This command requests the target node to respond by sending a data frame comprising buffered sensor data as read from the sensor identified by the code sent in Setup Byte 0.

Report Last New Data Record (MD=0x87):

This command initiates transmission of a data frame comprising the most recently acquired sensor data from the sensor identified by the code sent in Setup Byte 0. Unlike the Report New Sensor Data and Retransmit Last Sensor Data commands, the Report Last New Data Record command does not change any pointers to data buffered for retransmission. If a retransmit of this data is desired, this same command can be issued again. However, there is no guarantee that the data sent on a second attempt with be the same as that of the original attempt.

Reset Sensor Data Memory (MD=0x88):

The Reset Sensor Data Memory command requests the target node to clear all sensor data from the sensor specified by Setup Byte 0 and reset the sensor memory data pointers. Sensor data memory for each defined sensor on a tag would have a fixed size. The memory can be treated as a circular buffer with newer data overwriting older data. In such a case, the tag can keep pointers to the following sensor memory locations:

a circular buffer head, which points to the next memory location to write;

a circular buffer tail, which points to the beginning of the set of last-transmitted data records;

a new data pointer, which points to the start of a new set of data records that have been acquired but not yet transmitted; and a last data record, which points to the start of the most recently acquired data record.

Clear Routing Index (MD=0x89):

This command requests the target node to clear its routing index by filling the buffer with a reserved value (e.g., 0xFF) that does not correspond to an identifier of tags. Furthermore, the registration flag can be set to FALSE. The end result of executing the Clear Routing Index command can be removal from the network of registered tags.

Sleep (MD=0x8A):

The Sleep command causes the target node to turn off its RF receiver. The duration of deactivation can be defined by the value of the Setup Bytes. For example, Setup Byte 0 and Setup Byte 1 can store the LSB and MSB, respectively, of the deactivation period in seconds.

Chirp (MD=0x8B):

For tags having a device for generating sounds, this command requests the target node to sound its beeper for a specific time period. The period can be defined by the Setup Bytes, as described earlier.

As shown in Table 3, a frame descriptor value of 0x01 can correspond to a generic data frame and can define the message descriptor values as data format codes. The data format codes can include, but are not limited to, the following data formats, wherein the values for the message descriptor fields are given as non-limiting examples:

Sensor Data—Sensor Proprietary (MD=0x02-0x7F):

This message descriptor indicates that the sensor data format is proprietary in the sense that the format is defined by the application and can be sensor specific. Each sensor can be assigned a specific code, in this case, in the range of 0x02 to 0x7F. If multiple data frames are required to convey the sensor data, setup bytes can be used to parse the total data into a plurality of frames and then identify and sequentially organize each frame. For example, if two data frames are required to pass new sensor data, both frames can have 0x02 in Setup Byte 0, which can define the total data frames required/sent. The first data frame can have 0x00 in Setup Byte 1 and the second frame can have 0x01, wherein Setup Byte 1 defines the data frame sequence number.

Sensor Data—XML (MD=0x80):

This message descriptor indicates that the sensor data is in the extensible markup language (XML). Schema can be determined by the specific application.

Table 3 also shows that the Sensor Control Frame can be represented by a frame descriptor of 0x02 and can define the message descriptor values as sensor codes. Thus, the message descriptor value can identify a particular sensor on the target node to which a control string is directed. The control string can be stored as a data packet, which would be interpreted by and directed to the appropriate sensor according to the present frame and message descriptors.

A frame descriptor value of 0x03 can correspond to a Connection-Request Data Frame and can define the message descriptor values as the byte offset required to access successive UIDs in the data. According to the present non-limiting example, Connection-Request Data Frames can be sent from the data collection node to active RF tags and repeater tags to establish a chain of tags that will retransmit messages to establish a connection to a distant tag. The data packet can contain the routing index, which can define the nodes in a multi-hop connection. The routing index can comprise a list of tag UIDs that will compose the multi-hop connection. In one embodiment, the last non-zero UID in the routing index can represent the terminal tag of the connection request. The message descriptor value can represent the byte offset between UIDs contained in the routing index. Once a connection is established to a distant tag, additional Connection-Request Data Frames can be sent to that distant tag to further extend the network.

FIG. 3 shows an example of a routing index used in one embodiment of the present invention. Each registered tag maintains a routing index, which can be used in conjunction with a connection string, to determine whether or not the tag should retransmit a received message frame. When the original sender node's UID in the connection string matches the UID in Field A of a record 301, and the message sender node's UID in the connection string matches the UID in Field C 302 of the same record, the message frame is retransmitted (see steps 205 and 212 in FIG. 2). Similarly, when the target node's UID matches the UID in Field A of a record, and the message sender node's UID matches the UID in Field C, the message frame is retransmitted (see steps 204 and 210 in FIG. 2). The routing index can be implemented as a circular buffer, wherein the oldest record is overwritten with a new request when the buffer is full.

According to the present example, using the routing index described above, a Connection-Request Data Frame can be propagated from the target node to the terminal tag of the connection by the message target node first reading the byte offset from the Message Descriptor Field. The message target node can then read the 2-byte value from the data packet, which can comprise a connection string located at the byte offset. If the 2-byte value is non-zero, then the message sender node field of the received message frame is replaced with the UID from the 2-byte value read, the message descriptor field is incremented by 2, and the tag's routing index is updated to add a record with the terminal node's UID, the UID of the tag that sent the message, and the UID of the tag the connection request is being retransmitted to. The connection request is then forwarded to the next tag in the sequence. In the present example, if the 2-byte value equals 0x0000, then the message target node is also the terminal node. A connection request response frame can be returned to the original sender indicating successful connection.

As shown in Table 3, the present example can comprise at least one response frame, wherein the message descriptor values can be defined as error condition codes. The error condition codes can include, but are not limited to, error conditions indicating that a command was received (ACK), not understood (NACK), or that a time out occurred. Thus a message descriptor indicating an error condition can be sent in a command response frame (e.g., FD=0x81), a sensor control response frame (e.g., FD=0x82), or a connection request response frame (e.g., FD=0x83). Additional error condition codes can be included and still fall within the scope of the present invention.

Applications of the method embodied by the present invention include, but are not limited to, local or global visibility of high-value assets, controlled material inventory electronic article surveillance (EAS) with unique item identification, personnel access control, product and personnel authentication, electronic fences, electronic container seals, lock state/door state monitoring and reporting, asset health monitoring, commerce-related automated metering and reporting, land-based or marine-based rapidly deployable ad-hoc sensor networks, and combinations thereof. Commerce-related automated metering and reporting can include, but is not limited to road telematics, fuel dispensing, power metering, asset control and visibility, and combinations thereof. Land-based, or marine-based, rapidly deployable ad-hoc sensor networks can include, but are not limited to, detection of differential changes over a wide area or volume, animal behavior studies, disaster analysis and response, and combinations thereof.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. A method comprising the steps of:
providing a plurality of active RF tags within a volume of interest, each active RF tag comprising an application identifier, wherein said active RF tag maximizes battery life by utilizing a plurality of power consumption modes;
providing at least one data collection node;
registering level n nodes ($1 \leq n \leq N$), which comprise active RF tags accessible directly or indirectly by said data collection node, by compelling level n+1 nodes to report their unit identifiers to level n nodes, updating routing indices of said level n nodes with the unit identifiers of level n+1 nodes, sending to said data collection node by said level n nodes a transmission comprising level n+1 node unit identifiers, and updating registration status of said level n+1 nodes, wherein said updating occurs when said level n+1 nodes receive said transmission;
populating routing indices of registered nodes using connection strings, wherein said routing indices are stored in a data storage device of each registered active RF tag and provide path data for communication between registered nodes; and
communicating data between said active RF tags and said data collection node according to said routing indices;
thereby autonomously establishing and utilizing an active-RF-tag network, wherein said method utilizes a message frame structure for communications, said message frame structure comprising an application identifier field.

2. The method as recited in claim 1, wherein said active RF tags further comprise a segment identifier.

3. The method as recited in claim 1, wherein said active RF tags further comprise a unit identifier.

4. The method as recited in claim 1, wherein said at least one power consumption mode comprises a power-saving sleep mode, a low-power RF sniff mode, and a fast RF sniff mode.

5. The method as recited in claim 1, wherein a stimulus prompts a change in said power-consumption modes.

6. The method as recited in claim 5, wherein said stimulus is selected from the group consisting of a time alarm, a received command, RF energy, a sensor event, and combinations thereof.

7. The method as recited in claim 1, wherein said active RF tag further comprises a sensor for acquiring situational data.

8. The method as recited in claim 7, wherein said situational data comprises data selected from the group consisting of temperature, acceleration, vibrations, shock, motion, strain, humidity, pressure, radiation, electrical fields, conductivity, impedance, magnetic fields, electromagnetic irradiation, chemical, biological, flow, viscosity, density, sound, ultrasound, and combinations thereof.

9. The method as recited in claim 8, wherein said biological data comprises data selected from the group consisting of proteins, enzymes, antigens, antibodies, DNA sequences, human vital signs, and combinations thereof.

10. The method as recited in claim 1, wherein said routing indices comprise routing tables.

11. The method as recited in claim 1, wherein said routing indices are implemented as circular buffers having limited sizes.

12. The method as recited in claim 1, wherein said message frame structure comprises at least one fixed length.

13. The method as recited in claim 12, wherein a first fixed length comprises a short message frame.

14. The method as recited in claim 13, wherein said short message frame comprises data selected from the group consisting of commands and short responses.

15. The method as recited in claim 12, wherein a second fixed length comprises a long message frame comprising a data stream.

16. The method as recited in claim 15, wherein said data stream comprises data selected from the group consisting of routing indices, sensor control strings, tag control strings, sensor data, active-node locations, and combinations thereof.

17. The method as recited in claim 1, wherein said message frame structure comprises an address field.

18. The method as recited in claim 17, wherein said address field comprises addresses selected from the group consisting of a target-node unit identifier, a sender-node unit identifier, an originator-node unit identifier, a segment identifier, and combinations thereof.

19. The method as recited in claim 18, wherein said target-node unit identifier comprises a broadcast-command value, said broadcast command value indicating a message is intended for all tags within said transmission range.

20. The method as recited in claim 1, wherein said message frame structure further comprises a message ID field.

21. The method as recited in claim 1, wherein said message frame structure further comprises a message descriptor field.

22. The method as recited in claim 1, wherein said message frame structure further comprises at least one message-descriptor modifier field.

23. The method as recited in claim 1, wherein said message frame structure comprises check sums.

24. The method as recited in claim 23, wherein said check sums are selected from the group consisting of header check sums, data packet check sums, and combinations thereof.

25. The method as recited in claim 1, wherein said communicating comprises exchanging data arranged according to a means for structuring data.

26. The method as recited in claim 1, implemented on a computer readable medium.

27. A method comprising the steps of:
providing a plurality of active RF tags within a volume of interest, each active RF tag comprising an application identifier, wherein said active RF tag maximizes battery life by utilizing a plurality of power consumption modes;
providing at least one data collection node;
registering level n nodes ($1 \leq n \leq N$), wherein said level n nodes comprise active RF tags accessible directly or indirectly by said data collection node;
populating routing indices of registered nodes using connection strings, wherein said routing indices comprise routing tables having GPS-location data for said registered level n nodes (for $\leq n \leq N$), are stored in a data storage device of each registered active RF tag, and provide path data for communication between registered nodes;
communicating data between said active RF tags and said data collection node according to said routing indices;
thereby autonomously establishing and utilizing an active-RF-tag network, wherein said method utilizes a message frame structure for communications, said message frame structure comprising an application identifier field.

28. A method comprising the steps of:
providing a plurality of active RF tags within a volume of interest, each active RF tag comprising an application identifier that associates the active RF tag with a particular deployment purpose and distinguishes it from other active RF tags having a different deployment purpose, wherein said active RF tag maximizes battery life by utilizing a plurality of power consumption modes;

providing at least one data collection node;

registering level n nodes ($1 \leq n \leq N$), which comprise active RF tags accessible directly or indirectly by said data collection node, by compelling level n+1 nodes to report their unit identifiers to level n nodes, updating routing indices of said level n nodes with the unit identifiers of level n+1 nodes, sending to said data collection node by said level n nodes a transmission comprising level n+1 node unit identifiers, and updating registration status of said level n+1 nodes, wherein said updating occurs when said level n+1 nodes receive said transmission;

populating routing indices of registered nodes using connection strings, wherein said routing indices are stored in a data storage device of each registered active RF tag and provide path data for communication between registered nodes; and communicating data between said active RF tags and said data collection node according to said routing indices;

thereby autonomously establishing and utilizing an active-RF-tag network, wherein said method utilizes a message frame structure for communications, said message frame structure comprising an application identifier field.

29. A method comprising the steps of:

providing a plurality of active RF tags within a volume of interest, each active RF tag comprising an application identifier, wherein said active RF tag maximizes battery life by utilizing a plurality of power consumption modes;

providing at least one data collection node;

registering level n nodes ($1 \leq n \leq N$), wherein said level n nodes comprise active RF tags accessible directly or indirectly by said data collection node;

populating routing indices of registered nodes using connection strings, wherein said routing indices are stored in a data storage device of each registered active RF tag and provide path data for communication between registered nodes;

communicating data between said active RF tags and said data collection node according to said routing indices;

thereby autonomously establishing and utilizing an active-RF-tag network, wherein said method utilizes a message frame structure for communications, said message frame structure comprising an application identifier field and an address field having addresses selected from the group consisting of a target-node unit identifier, a sender-node unit identifier, an originator-node unit identifier, a segment identifier, and combinations thereof, and wherein said sender-node unit identifier is updated when a new tag relays a received message frame.

30. A method comprising the steps of:

providing a plurality of active RF tags within a volume of interest, each active RF tag comprising an application identifier, wherein said active RF tag maximizes battery life by utilizing a plurality of power consumption modes;

providing at least one data collection node;

registering level n nodes ($1 \leq n \leq N$), wherein said level n nodes comprise active RF tags accessible directly or indirectly by said data collection node;

populating routing indices of registered nodes using connection strings, wherein said routing indices are stored in a data storage device of each registered active RF tag and provide path data for communication between registered nodes;

communicating data between said active RF tags and said data collection node according to said routing indices;

thereby autonomously establishing and utilizing an active-RF-tag network, wherein said method utilizes a message frame structure for communications, said message frame structure comprising an application identifier field and at least one message-descriptor modifier field used to assign said active nodes a transmit time slot when a plurality of active RF tags are transmitting.

31. A method comprising the steps of:

providing a plurality of active RF tags within a volume of interest, each active RF tag comprising an application identifier, wherein said active RF tag maximizes battery life by utilizing a plurality of power consumption modes;

providing at least one data collection node;

registering level n nodes ($1 \leq n \leq N$), wherein said level n nodes comprise active RF tags accessible directly or indirectly by said data collection node;

populating routing indices of registered nodes using connection strings, wherein said routing indices are stored in a data storage device of each registered active RF tag and provide path data for communication between registered nodes;

communicating data between said active RF tags and said data collection node according to said routing indices;

thereby autonomously establishing and utilizing an active-RF-tag network, wherein said method utilizes a message frame structure for communications, said message frame structure comprising an application identifier field and at least one message-descriptor modifier field used to seed a pseudo-random number generator.

* * * * *